Figure 4:
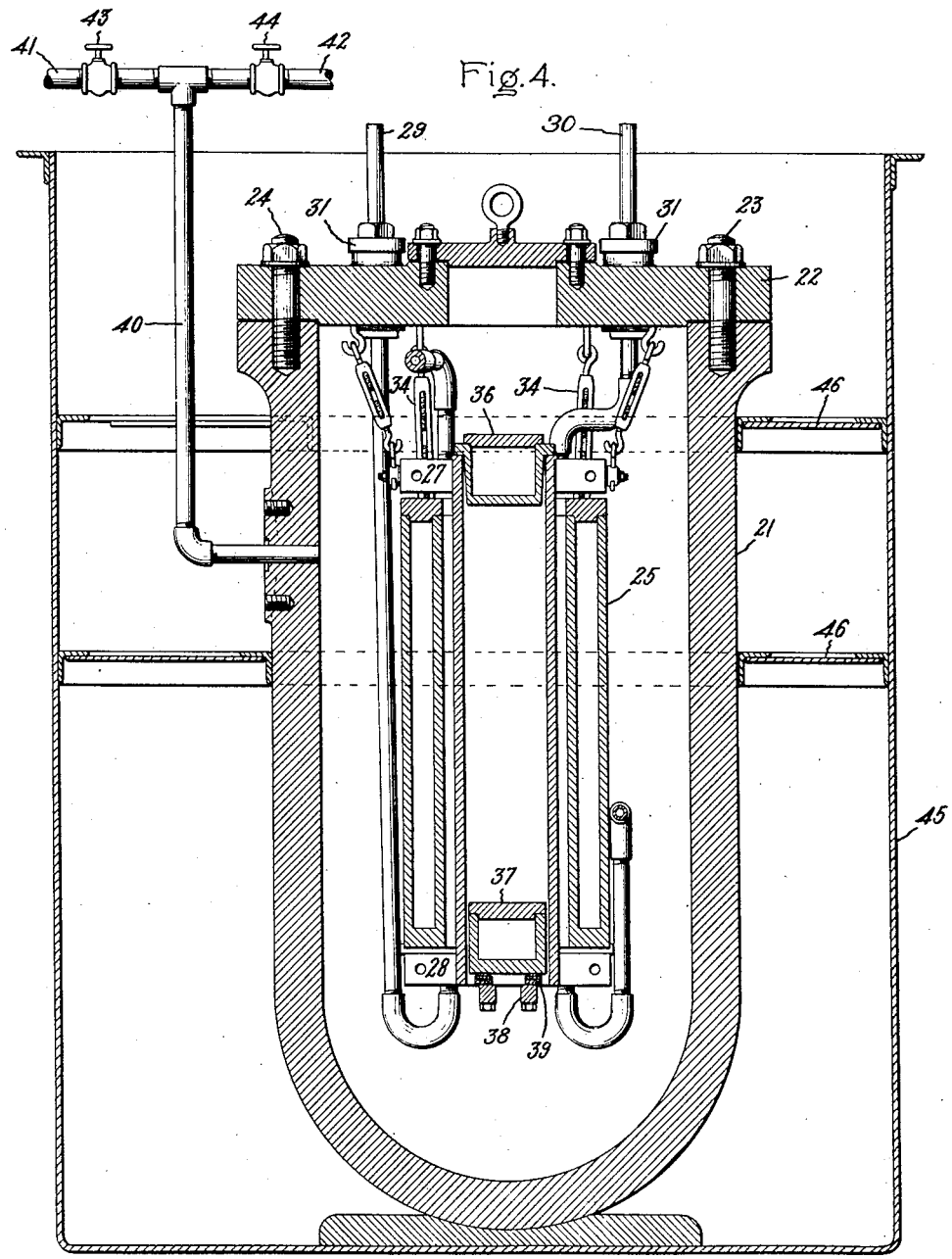

May 5, 1925. 1,536,821
P. K. DEVERS
APPARATUS FOR AND METHOD OF MAKING VITREOUS SILICA
Filed Sept. 27, 1924 3 Sheets-Sheet 1
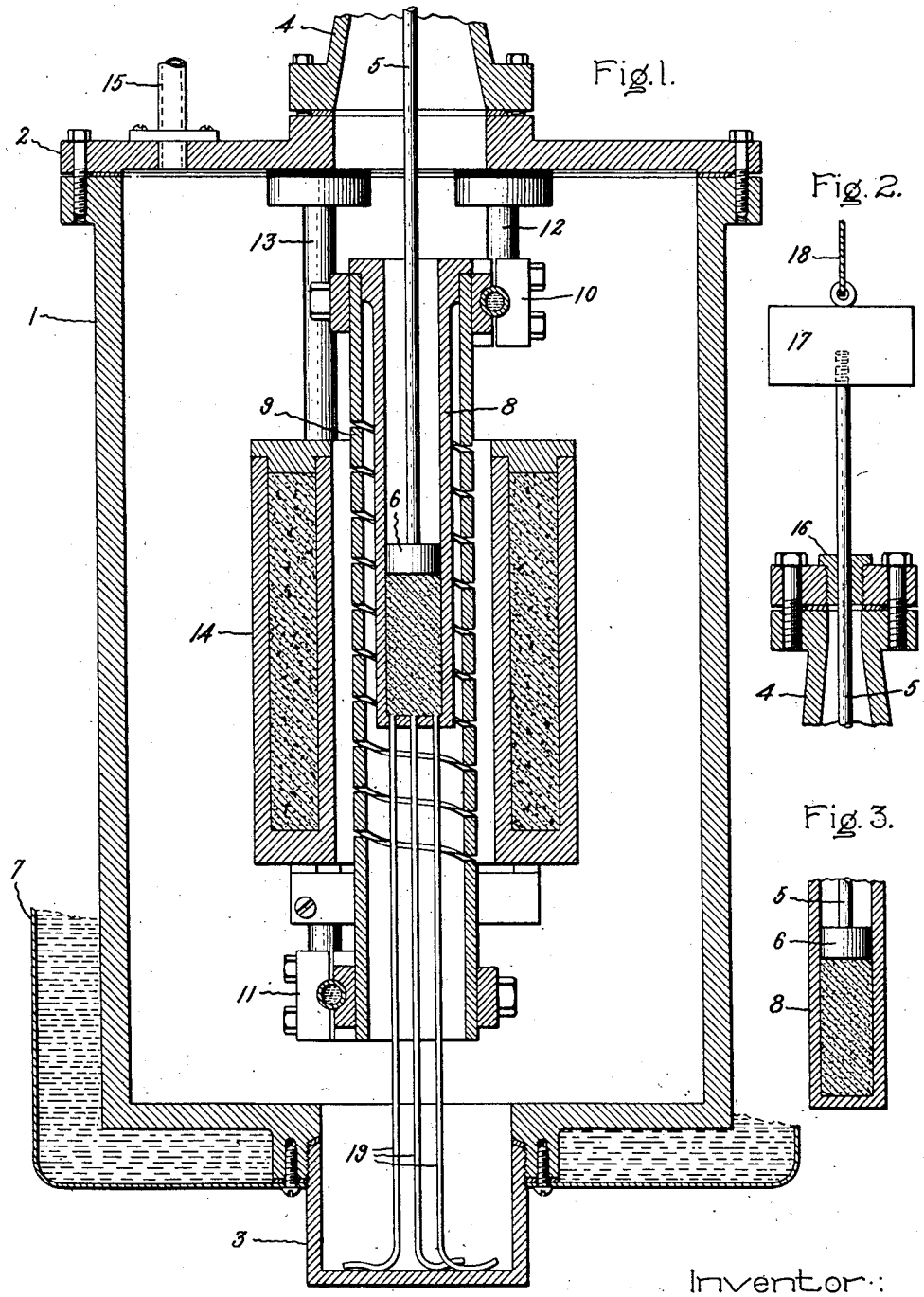
Inventor:
Philip K. Devers,
by *[signature]*
His Attorney.

May 5, 1925.　　　　　　　　　　　　　　　　　1,536,821
P. K. DEVERS
APPARATUS FOR AND METHOD OF MAKING VITREOUS SILICA
Filed Sept. 27, 1924　　　3 Sheets-Sheet 2

Inventor:
Philip K. Devers,
by
His Attorney

Patented May 5, 1925.

1,536,821

UNITED STATES PATENT OFFICE.

PHILIP K. DEVERS, OF LYNN, MASSACHUSETTS, ASSIGNOR TO GENERAL ELECTRIC COMPANY, A CORPORATION OF NEW YORK.

APPARATUS FOR AND METHOD OF MAKING VITREOUS SILICA.

Application filed September 27, 1924. Serial No. 740,416.

*To all whom it may concern:*

Be it known that I, PHILIP K. DEVERS, a citizen of the United States, residing at Lynn, in the county of Essex, State of Massachusetts, have invented certain new and useful Improvements in Apparatus for and Methods of Making Vitreous Silica, of which the following is a specification.

This application is a continuation in part of my application Serial No. 457,030, filed March 30, 1921.

The present invention relates to the manufacture of vitreous silica, also known as fused quartz and silica glass, and particularly to the production of fused silica which is substantially free from trapped bubbles.

When a pure crystalline silica, for example, clear native quartz crystal is heated in the air up to the melting point, the quartz crystal first cracks into many pieces at a temperature of about 550° C., then at higher temperatures these pieces coalesce to form a plastic mass in which are trapped many air bubbles. Due to the high viscosity of the molten silica these bubbles can be removed only with great difficulty. Many of the bubbles are so small as to be visible only as a cloudiness or milkiness in the mass resulting from the fusion.

For various industrial purposes, particularly for the manufacture of lamps and optical devices, it is necessary to use clear, substantially bubble-free quartz. For various other purposes the use of clear material, although not strictly necessary, is very desirable. Although various fusion methods of producing clear fused quartz in quantity have been suggested prior to my invention, as far as I am aware, the practical art of fused quartz manufacture has depended entirely upon slow, painstaking handwork. Even by the hand method of patiently building up vitreous silica bit by bit in the blow pipe flame it is difficult or even impossible to produce large masses of optically clear quartz.

In accordance with one suggested process quartzose material is said to fuse under gaseous pressure at a temperature sufficiently high to produce a condition of high liquidity to allow bubbles to escape. The gas pressure upon the quartz, which is intended to reduce volatilization, of course, increases the inclusion of gas when the particles coalesce and retards the elimination of gas bubbles when the silica becomes liquid. This method, to my knowledge, has not been used for the practical production of clear quartz devices.

In order to assist gas bubbles to rise to the surface of a liquid mass of silica, the opposite procedure of melting quartz in a vacuum to a condition of sufficient liquidity for casting has been described in the patent literature. This process entails an excessive volatilization of silica, losses of material to the extent of 50% and even higher being encountered with the accompanying difficulties of clogging the vacuum furnace with volatilized silica. Both processes entail the use of unusually high temperatures in an enclosed space.

In accordance with one of the features of my invention clear, substantially bubble-free silica articles are produced by heating crystalline quartz, or any other suitable siliceous material, in a vacuum to a temperature sufficiently high to produce plasticity, and then subjecting the silica while in a plastic state to pressure. Heating the siliceous material to a plastic state in a vacuum very materially reduces the gas which is entrapped by the coalescence of the particles, and by the subsequently applied pressure these bubbles are almost entirely eliminated, partly by compression of the attenuated gas in the cavities and partly by actual absorption or solution of the gas by the quartz when plastic and under pressure. Volatilization of silica is reduced by my process as the temperatures are not excessively high. In accordance with another feature of my invention silica is shaped in a plastic state by extrusion under pressure, as distinguished from the utilization of a liquid melt by casting or otherwise.

My invention in one of its aspects utilizes the compression step to perform the additional function of shaping the plastic silica to a desired form.

Figure 5:
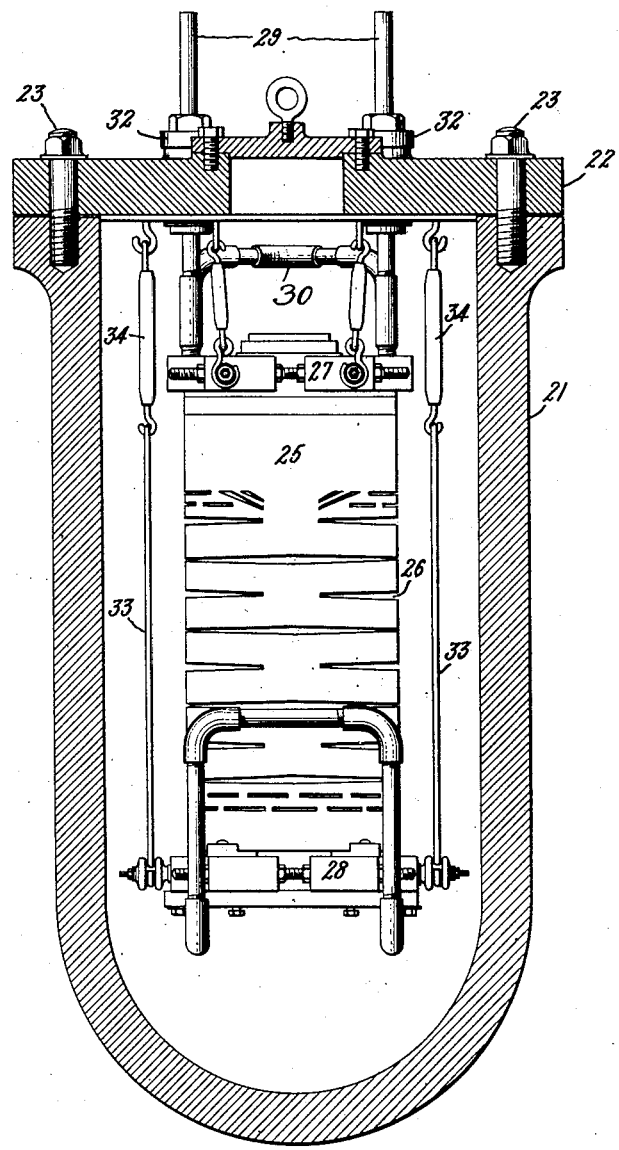

The accompanying drawing shows in vertical section in Fig. 1 a suitable furnace for carrying out the process constituting my invention, Fig. 2 being a fragmental sectional view of the upper part of the furnace which is not shown in Fig. 1, Fig. 3 shows in section a retort for carrying out the compression of the plastic silica glass without accompanying extrusion of the glass, and Figs. 4 and 5 are sectional views, taken at right angles to each other, of a modified furnace which is particularly adapted for high gas pressure treatment in conjunction with vacuum fusion.

The vacuum furnace has been shown in Fig. 1 in a rather diagrammatic way as furnaces of this general type are well known. The furnace comprises a metal tank 1 having a removable cover 2 and a detachable well 3 at the bottom into which strips or canes of silica may be extruded and accumulated. The furnace may be provided at the upper part with a removable column 4 through which a shaft 5 carrying at its end a piston 6 may be introduced for compressing the plastic silica. The various joints may be made vacuum-tight by suitable washers which have been indicated in the drawing.

The furnace may be immersed in a cooling fluid in an outer tank 7 which has been indicated in part only. The crystalline quartz, or other siliceous material, which constitutes the raw material from which clear silica glass is to be made, is contained within a graphite crucible 8 which is supported within a helical resistor 9 which serves as the heating means. This resistor is provided at its opposite ends with suitable electric terminals 10, 11, which conveniently are supported by metal tubes 12, 13, from the cover of the furnace and suitably insulated electrically as indicated in the drawing. The tubes 12, 13, serve also to conduct a cooling fluid through the clamps 10, 11. Surrounding the resistor 9 is a heat screen 14 which may consist of a shell of carbon or graphite containing a refractory material, such as charcoal. The graphite crucible should preferably be preheated to a temperature of about 2000° C. before the charge of silica is placed therein.

When the charge of silica has been placed within the crucible 8 the furnace is evacuated through a tube 15. When a vacuum as low as a few millimeters of mercury has been produced the furnace is brought up to temperature by conducting a suitable heating current through the resistor 9. At about 550° C. the conversion of crystalline quartz to an allotropic form occurs with the accompanying cracking or shattering of the crystal. At a temperature of about 1650° C. the silica particles begin to soften and coalesce. Preferably the temperature of the charge is raised to about 1750° C. the vacuum pump being kept constantly operating to remove gases which are given off during the fusion. At this temperature the quartz is in a soft plastic state, but is not a readily mobile liquid. By this fusion the crystalline silica is converted to the vitreous or glassy state. Only a relatively small amount of gas is trapped by the coalescing of the particles of quartz or silica constituting the charge.

In a vacuum there is very little tendency for graphite or carbon to discolor a quartz fusion by chemical reaction. By this fusion in a vacuum a slug of clear vitreous material is obtained which has scattered through it at random cavities or bubbles but which is free from the milkiness caused by minute bubbles. This product may be used as raw material for subsequent processes of shaping quartz which may eliminate the cavities or for purposes in which the presence of bubbles may be tolerated.

The cavities may be reduced by exerting pressure upon the charge, as by bringing the piston 6 down into the crucible 8 into contact with the charge. The upper part of the stem 5 of this piston preferably consists of some soft metal, such as copper, joined to carbon where it enters the high temperature zone and it passes through a shoulder 16 of graphite, or suitable soft alloy containing graphite, such as genelite, thereby making a vacuum-tight joint. Preferably the upper end of the rod 5 is provided with a weight 17 and supported by a cable 18.

As already indicated, the pressure of the piston 6 upon the plastic silica reduces the size of the larger cavities and causes the entire disappearance of the smaller cavities. This is an effect probably due in part to the compression of the highly attenuated gas in the cavities. For example, if the gas residue in a cavity has a pressure of about 20 to 30 millimeters of mercury then a pressure equal to only about two or three atmospheres upon the plastic quartz will reduce the size of the cavity to about 1/100th of its original volume. In part the reduction in size of the cavities and the total elimination of some of the cavities must be due to absorption of some of the gases within the cavities.

In Fig. 3 I have shown a retort 8 which is closed. In this case the piston 6 acts only to improve the transparency and clearness of the resulting slug of silica glass. This slug may be utilized as raw material for the manufacture of quartz articles, by a process which does not constitute a part of my present invention.

Compression also may be obtained by a fluid under pressure which is led into the chamber containing the plastic quartz through the pipe 15 passing through the cover. In this case a valve (not shown) may be used which will be open during the evacuation of the container and will automatically close under pressure when the gas is let in.

I may utilize the compression to accomplish not only the clarifying of the silica glass, but also for extrusion of the same into some shape suitable for subsequent manufacturing steps as shown. For example, in Fig. 1, in which the plastic silica is squirted in vacuo as cane through several openings in the bottom of the crucible. This extrusion also assists in the more complete elimination of gas bubbles, as described and claimed in another application filed by E. R. Berry, Serial No. 456,577, March 29, 1921. The resulting cane or strands 19 of silica glass may be collected in the well 3 which may be as deep as desired.

The fusion furnace shown in Figs. 4 and 5 is essentially the same as the furnace shown in Fig. 1, but its construction is adapted particularly for very high pressures. The furnace wall 21 consists of steel and is several inches thick, the cover 22 being secured by heavy bolts 23, 24. The heater 25 also consists of graphite and as shown in Fig. 5 has slots 26 cut therein to lengthen the path of the current and to increase the electrical resistance. The heater is connected at opposite ends to copper terminals 27, 28 which are cooled by a fluid circulated through copper tubes imbedded in the terminals and passing through the cover 22. These tubes also serve as current conductors. In Fig. 4 the cooling tube 29 whereby the terminal 28 is cooled has been shown. Fig. 5 shows the cooling duct 30 for the upper terminal. Suitable insulating seals 31, 32 insure vacuum tightness and electrical insulation. The electrodes are supported partly by the cooling tubes and partly by the suspension rods 33 which contain turnbuckles 34 for adjustment.

At the bottom and top of the heating space within the resistor graphite cup screens 36, 37 charged with graphite are provided, which act as heat insulators. The screen 37 also acts as a support for a crucible (not shown) in which the quartz charge is held. The cup screen 37 in turn is supported on an iron frame-work 38 attached to the lower electrode 28, an asbestos ring 39 being provided for electrical insulation.

The furnace is both evacuated and also charged with a fluid under pressure through the conduit 40 which communicates with a vacuum pipe 41 and a pressure pipe 42. After fusion of the quartz in a vacuum, the valve 43 is closed and the pressure valve 44 is opened. Although a non-oxidizing gas, such as nitrogen, is preferred for this step air may be used. A gas at a pressure as high as 3000 pounds to the square inch, or higher, may be used to advantage when a high grade fused quartz is desired, such as may be used for optical purposes. In some cases a lower pressure, say about 1000 pounds to the square inch, will sufficiently clear the quartz fusion of bubbles for many commercial purposes. The exterior of the furnace may be surrounded by water, or other cooling fluid, in a tank 45 containing ribs 46 to support the furnace.

What I claim as new and desire to secure by Letters Patent of the United States, is,—

1. The method of making vitreous silica which consists in fusing silica in an enclosed space while maintaining a vacuum in said space and thereupon compressing the fusion at a pressure high enough to substantially eliminate bubbles.

2. The method of making bubble-free vitreous silica which consists in fusing silica in an evacuated enclosed space, exhausting gases from said space during the the fusion and compressing the fused mass while plastic to reduce enclosed cavities.

3. The method of shaping silica which consists in fusing crystalline silica in a vacuum to a temperature high enough to convert the same to a vitreous state, raising the temperature to about 1750° C. to render said silica plastic and thereupon compressing the silica to materially reduce bubbles.

4. The method of reducing bubbles or cavities in vacuum-fused vitreous silica which consists in subjecting said silica to pressure while heated to about 1750° C.

5. The method of producing elongated articles of clear vitreous silica or quartz which consists in heating crystalline silica in a maintained vacuum to about 1750° C., extruding the fused mass in a plastic state under pressure through an orifice of desired configuration, and maintaining the extruded material in the form assumed by said extrusion.

6. The method of shaping silica which consists in subjecting silica to a temperature of about 1750° C. to render the same plastic, and extruding the plastic mass by pressure through an orifice.

7. The method of making clear silica glass which consists in heating silica particles in a carbonaceous container in a highly evacuated space to a temperature of coalescence and applying pressure to the silica while heated materially below a temperature of fluidity.

8. The method of making clear silica glass which consists in heating silica in an evacuated space to a temperature of 1750° C. and thereupon after said fusion is complete subjecting the plastic mass to a pressure sufficiently high to largely eliminate cavities.

9. The method of making articles from silica glass which consists in converting a mass of crystalline quartz to the vitreous or glassy state while substantially preventing the inclusion of gas and subjecting said glass at a temperature of about 1650° to 1750° C. to pressure to render the same more homogeneous.

10. An article of manufacture, a slug of vitreous silica containing evacuated cavities, said slug being produced by the coalescence of silica particles in a vacuum at a temperature materially below the temperature at which silica becomes fluid and capable of being rendered when plastic free from cavities by the application of pressure.

11. The method of preparing clear silica glass which consists in heating clear crystalline silica to a temperature of fusion in an evacuated enclosed space and while said silica is fused admitting to said space a gas under sufficiently high pressure to substantially eliminate cavities in said silica.

12. The method of producing strips or cane of vitreous silica or quartz in a clear, substantially bubble-free state which consists in fusing clear crystalline silica to a temperature of about 1750° C. in an evacuated space, removing gases during said fusion from said space, extruding said silica under pressure while plastic through an orifice of desired configuration, and maintaining the extruded material in the form assumed by said extrusion.

13. The step in the manufacture of vitreous silica or quartz which consists in fusing crystalline quartz in a graphite container in an evacuated space.

14. The step in the manufacture of vitreous silica or quartz which consists in heating crystalline quartz in a graphite container in an evacuated space to about 1750° C.

15. The method of reducing cavities in vacuum-fused silica which consists in subjecting said silica while heated to about 1750° C. to a fluid under pressure.

16. The method of making vitreous silica which consists in fusing silica in an enclosed space while maintaining a vacuum in said space and thereupon compressing the fusion with a gas at a pressure high enough to substantially eliminate bubbles.

17. The method of making vitreous silica which consists in fusing silica in an enclosed space while maintaining a vacuum in said space and thereupon compressing the fusion with a gas at a pressure of about 1000 to 3000 pounds to the square inch.

In witness whereof, I have hereunto set my hand this 24th day of September, 1924.

PHILIP K. DEVERS.